United States Patent
Shiell et al.

(10) Patent No.: US 11,899,617 B2
(45) Date of Patent: Feb. 13, 2024

(54) SYSTEMS AND METHODS FOR DYNAMIC CONTENT OPTIMIZATION AT THE NETWORK EDGE USING SHARED CUSTOMIZABLE FUNCTIONS

(71) Applicant: VERIZON PATENT AND LICENSING INC., Basking Ridge, NJ (US)

(72) Inventors: Derek Shiell, Santa Monica, CA (US); Francois Lacroix, London (GB)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 518 days.

(21) Appl. No.: 17/121,319

(22) Filed: Dec. 14, 2020

(65) Prior Publication Data

US 2022/0188266 A1  Jun. 16, 2022

(51) Int. Cl.
  G06F 16/11 (2019.01)
  G06F 16/14 (2019.01)
  G06F 16/172 (2019.01)
  H04L 67/568 (2022.01)

(52) U.S. Cl.
  CPC ......... *G06F 16/116* (2019.01); *G06F 16/148* (2019.01); *G06F 16/172* (2019.01); *H04L 67/568* (2022.05)

(58) Field of Classification Search
  CPC .... G06F 16/116; G06F 16/148; G06F 16/172; H04L 67/568
  See application file for complete search history.

(56) References Cited

U.S. PATENT DOCUMENTS

| | | | | |
|---|---|---|---|---|
| 2006/0112174 A1* | 5/2006 | L'Heureux | ........... | H04L 67/565 709/225 |
| 2012/0096106 A1* | 4/2012 | Blumofe | ................. | H04L 67/06 709/213 |
| 2014/0280515 A1* | 9/2014 | Wei | ........................ | H04L 67/565 709/203 |
| 2018/0213053 A1* | 7/2018 | Yeager | ................... | H04L 67/568 |
| 2019/0058755 A1* | 2/2019 | Joe | ........................... | H04L 65/60 |
| 2021/0400047 A1* | 12/2021 | Gu | ........................ | H04L 63/083 |

FOREIGN PATENT DOCUMENTS

| | | | | |
|---|---|---|---|---|
| CN | 108259544 A | * | 7/2018 | ......... G06F 16/9566 |
| CN | 108701158 A | * | 10/2018 | ......... G06F 16/2255 |

* cited by examiner

*Primary Examiner* — Hosain T Alam
*Assistant Examiner* — Robert F May

(57) ABSTRACT

Provided is an edge compute platform ("ECP") for serving optimized content from local cache or from output of a shared customizable function executed by a compute device at the network edge on behalf of different customer content such that the function is not redundantly deployed for different customer content, and is not be executed each time the same variant of the optimized content is requested. The ECP may canonicalize first transformation parameters of a received original request according to a transformation parameter definition of a particular function that is implicated by the original request, may generate second transformation parameters with a different ordering than the first transformation parameters as a result of the canonicalization, may generate a variant of the original file by inputting the second transformation parameters to the particular function, and may provide the variant in response to the original request.

20 Claims, 8 Drawing Sheets

SYSTEMS AND METHODS FOR DYNAMIC CONTENT OPTIMIZATION AT THE NETWORK EDGE USING SHARED CUSTOMIZABLE FUNCTIONS

BACKGROUND

Edge computing may involve uploading and executing customer-defined functions from different shared compute resources of a distributed platform (e.g., a content delivery network) that are closest to different network locations of users accessing those functions. Such edge computing may impose the burden of developing, deploying, and managing each function on the customer. Moreover, such edge computing may lead to an inefficient use of the distributed platform compute resources. For instance, different customers may define and execute the same function, but the customers may be unable to use one another's function. Accordingly, redundant instances of the same function or inefficiently coded functions may consume different compute resources at the same network location, and may execute simultaneously for different distributed platform customers. Similarly, the same particular function may repeatedly consume the same compute resources in order to generate the same output for different users requesting and/or invoking that particular function.

DETAILED DESCRIPTION OF PREFERRED EMBODIMENTS

Figure 1:
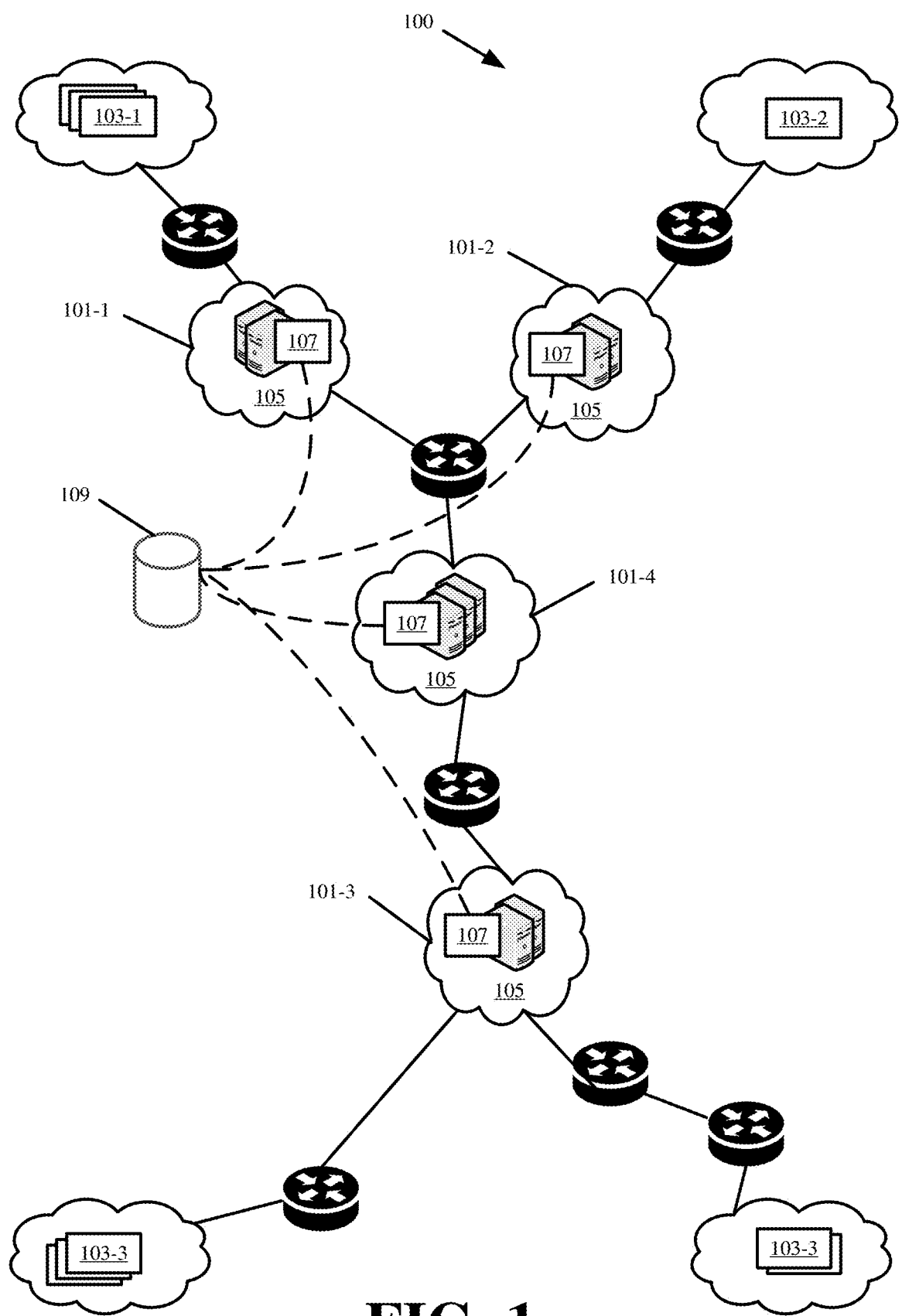
FIG. 1 illustrates an example architecture for an edge compute platform ("ECP") in accordance with some embodiments described herein.

The following detailed description refers to the accompanying drawings. The same reference numbers in different drawings may identify the same or similar elements.

Systems and methods, as described herein, provide dynamic content optimization at the network edge using shared customizable functions. In particular, the systems and methods may include an edge compute platform ("ECP") that provides different customers shared access to a common set of functions so that the customers may use the functions without coding, deploying, and/or managing each of the common set of functions. The ECP may execute each of the common set of functions from any of several network edge locations of the ECP.

The output that is produced by each of the common set of functions may be dynamically customized by a set of Uniform Resource Locator ("URL"), header, and/or other transformation parameters. The transformation parameters may be provided with each request to call or invoke a function of the common set of functions such that each customer may tailor the common set of functions to produce desired output without having to write and/or modify the function code, deploy the function, and/or individually manage each of the common set of functions. In some embodiments, the transformation parameters may include conditional parameters that modify operation of the function based on the presence or absence of other values in request URL, header, and/or body that may be unrelated to the transformation parameters and/or function definition. In some such embodiments, the ECP may dynamically rewrite the request URL and/or transformation parameters by setting or removing the conditional parameters prior to calling the function.

Moreover, the ECP may cache and reuse output that is generated from executing any of the set of common functions with a particular set of transformation parameters. In doing so, the ECP may provide the cached output in response to a subsequent call or invocation of the same function with the particular set of transformation parameters in a canonicalized, standardized, normalized, or consistent format without executing the function again and/or using compute resources of the ECP to respond to the subsequent call or invocation.

The common set of functions may include services, scripts, applications, and/or executable code that consumes one or more compute resources when invoked or executed. The compute resources may include processor, memory, storage, and/or other resources of a server or device that executes the function to generate and/or return the function output to a requesting user. For example, the common set of functions may include an image optimization function that different customers may use to reformat and/or transform image files for efficient delivery and/or presentation on a user device that requests content with one or more of the image files. Specifically, the ECP may execute the image optimization function to convert an uncompressed 1920×1080 resolution image to a lower resolution and compressed 320×320 image prior to sending the image to a first user device with a 6 inch or smaller screen size, and may convert the uncompressed 1920×1080 resolution image to a different encoding or format (e.g., from a *.tiff encoding to a *.jpg encoding) prior to sending the image to a second user device that does not support the original encoding or format of the image.

In some embodiments, the common set of functions may include functions for modifying and/or generating images, videos, media, virtual reality content, code, maps, and/or other services that may be accessed from a remote source. In some embodiments, the common set of functions may modify a file by resizing, changing resolution, compressing, rotating, scaling, changing formatting, changing an encoding of the file, trimming, padding, blurring, stripping metadata, and/or performing other operations that alter the file data. Consequently, the ECP may invoke one or more of the common set of functions in response to a request for particular content, may modify the particular content using the one or more functions, and may respond to the request with the modified content that is output from the one or more functions instead of the original version of the particular content.

FIG. 1 illustrates an example architecture for ECP 100 in accordance with some embodiments described herein. ECP 100 may be a distributed platform that provides different customers and/or users shared access to a common set of customizable functions (e.g., applications, programs, scripts, code, operations, and/or software), the content that results from the function execution, and/or other content that may be requested and distributed from ECP 100.

ECP 100 may include different Points-of-Presence ("PoPs") 101-1, 101-2, 101-3, 101-4 (herein sometimes collectively referred to as "PoPs 101" or individually as "PoP 101"). User requests for content and/or function execution may be routed to PoP 101 that is closest to a location of the requesting user device. ECP 100 may include more or fewer PoPs 101 based on a larger or smaller distributed presence and/or demand.

PoPs 101 may be hierarchically arranged. For instance, PoPs 101-1, 101-2, and 101-3 may be at a first-tier of ECP 100, and PoP 101-4 may be at a second-tier of ECP 100 and/or may correspond to an origin PoP of ECP 100. Each first-tier PoP 101-1, 101-2, and 101-3 may receive calls to execute different functions from a different subset of user devices 103 operating from nearby geographic locations, and/or may receive requests for different content in an original form and/or a modified form that results from applying one or more of the common set of customized functions to the content. For instance, requests to execute a particular function from user devices 103-1 may route to PoP 101-1, whereas requests to execute the same particular function from user devices 103-2 may route to PoP 101-2. The hierarchical arrangement allows for a request, that is initially received by a first-tier PoP, to be executed at a second-tier PoP or lower-tier PoP, when the requested function is not configured and/or initialized at the first-tier PoP and results in a "function miss", and the requested function is configured and/or initialized at the second-tier PoP or lower-tier PoP.

PoPs 101 may be accessed via a common network address. For instance, each PoP 101 may be accessed with a shared Anycast address, and Anycast routing may route requests issued by user devices 103, that are directed to the Anycast address, that request execution of a particular function, and/or that request content resulting from execution of the particular function, to the closest PoP 101. The closest PoP 101 may be determined based on Border Gateway Protocol ('BGP') routing tables, a number of network hops, latency, and/or other criteria. In some embodiments, each PoP 101 may be assigned a different network address, and Domain Name System ("DNS") request resolution may be used to resolve requests with a common domain name (e.g., "exampleECP.com") to the network address of a geographically closest PoP 101.

Each PoP 101 may include one or more compute devices 105 that have configurable compute resources, and one or more controllers 107 to manage the compute resources and the executable environments for the common set of functions and/or other functions that are executed using the compute resources of compute device 105. In some embodiments, a different instance of controller 107 may run in conjunction with each compute device 105. In some other embodiments, controller 107 may be a device that is separate from compute devices 105 in a PoP 101, and a single instance of controller 107 may manage the compute resources of multiple compute devices 105 in the same PoP 101.

The configurable compute resources of a particular compute device 105 may include processor, memory, storage, and/or other hardware resources of the particular compute device 105 that may be configured and/or used to execute different functions of the common set of functions. Each PoP 101 may include the same or different number of compute devices 105, and each compute device 105 may have the same or different compute resources than other compute devices 105 in the same PoP 101. In some embodiments, the configurable compute resources may also be used to receive requests for content, and to serve the requested content to the requesting user device 103 from cache, an external source, and/or from the output of one or more functions.

Each compute device 105 in a PoP 101 may be assigned a different network address, and may execute different functions of the common set of functions. Requests to execute a function may be addressed to a network address of a PoP 101, and a load balancer or request director (not shown in FIG. 1) in that PoP 101 may perform a persistent distribution of the requests across compute devices 105 in that PoP 101 so that requests for execution of a particular function are issued to the same compute device 105 that has initialized the executable environment for that particular function, and/or that is tasked with executing that particular function. Since requests may be routed to different PoPs 101, compute devices 105 in different PoPs 101 may be configured and/or initialized with executable environments for executing different functions from the common set of functions.

In some embodiments, controller 107 may build and/or retrieve the executable environment for one or more of the common set of functions in response to that controller 107 or an associated compute device 105 receiving one or more requests to execute the one or more functions. Controller 107 may also control the deployment, initialization, and/or removal of executable environments for different functions on one or more compute devices 105. In some embodiments, controller 107 may monitor usage of the compute resources of one or more compute devices 105 as well as execution of different executable environments for different functions in order to determine which executable environments to deploy, initialize, retain, and/or remove from the compute devices 105. Accordingly, controller 107 may scale the number of compute resources and/or compute device 105 that execute a particular function based on demand for that particular function.

ECP 100 may also include function repository 109. Function repository 109 may include one or more storage devices for receiving and storing the common set of functions and/or other functions may be entered into ECP 100. More specifically, function repository 109 may receive the services, applications, programs, scripts, code, software, and/or function definitions that may be customized and executed at different compute devices 105 of ECP 100. The functions may be defined in any one of several supported programming languages. For instance, compute resources of ECP 100 may execute functions written in Python, NodeJS, JavaScript, C++, C#, C, Ruby, Perl, and/or other scripting and programming languages.

In some embodiments, function repository 109 may build an executable environment for each function. The executable environment may include the operations of a function in a logical package or standardized unit that can be run and/or executed from any compute device 105 of ECP 100 regardless of the language, format, and/or other properties of the function. In particular, the executable environment may be an image, container (e.g., Docker, Kubernetes, etc.), virtual machine, or other package that incorporates the function code with other software and dependencies (e.g., code, runtime, system libraries, etc.) so that the function within the executable environment may run directly on the operating system or within the kernel of a compute device 105.

Controller 107 in each PoP 101 may directly interface with function repository 109 in order to receive updated and/or new functions (e.g., the executable environment for running each function on the compute resources). Controller 107 may selectively configure different compute devices 105 to execute different functions based on the updated and/or new functions obtained from function repository 109.

In some embodiments, ECP 100 may represent a content delivery network ("CDN") with edge computing functionality. In some other embodiments, ECP 100 may be integrated as part of a CDN, and/or may use existing resources of the CDN to execute the common set of functions from different PoPs of the CDN. For instance, ECP 100 may adapt the CDN caching servers for low latency function execution. The CDN caching servers can continue to accelerate content delivery by caching and serving cached content in response to user requests for the cached content, and compute resources of the same CDN caching servers may be used to execute different functions in response to user requests for execution of the different functions.

In some other embodiments, ECP 100 may be an independent distributed platform that is optimized for function execution and/or for providing edge compute functionality (e.g., function execution at different network edges). For instance, compute devices 105 of ECP 100 may have less storage than caching servers of a CDN, and may have more powerful processors or more processors than the CDN caching servers.

ECP 100 may also integrate with and/or use Multi-Access Edge Compute ("MEC") devices of a telecommunications network and/or other MEC operator. The MEC devices may include configurable compute and/or other resources that may be located at or near different network points of entry. For instance, the MEC devices may be deployed and/or operated by a telecommunications network operator at or near one or more Radio Access Networks ("RANs") and/or base stations of the telecommunications network, and may be used to provide low latency content distribution, services, processing, and/or data to users that operate from the network point(s) of entry associated with each MEC device. The MEC devices may provide the same, more, or less compute resources than compute devices 105 in PoPs 101. For instance, each MEC device may serve a smaller set of users than each compute device 105, and may therefore have fewer compute resources available for function execution.

In some embodiments, the MEC devices may be geographically closer (e.g., fewer network hops and/or less latency) to a subset of user devices 103 than a nearest PoP 101. Accordingly, the MEC devices may provide an additional tier of configurable compute resources for function execution to ECP 100, and the MEC devices may be interchangeably referred to as compute devices 105 of ECP 100.

Figure 2:
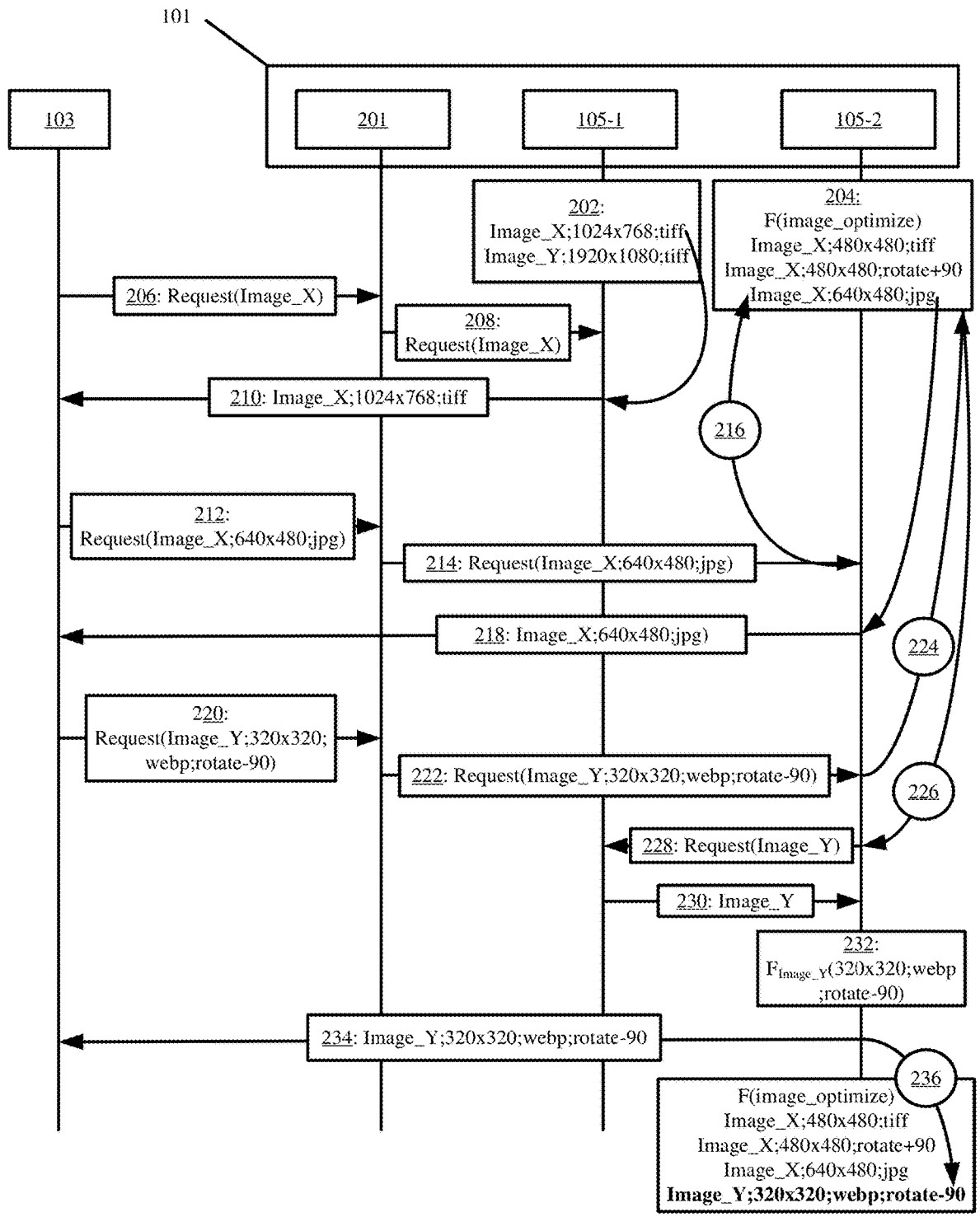
FIG. 2 illustrates an example of dynamically optimizing content at a particular network edge of the ECP using a shared customizable function in accordance with some embodiments presented herein.

FIG. 2 illustrates an example of dynamically optimizing content at a particular network edge of ECP 100 using a shared customizable function in accordance with some embodiments presented herein. FIG. 2 presents a message exchange between one or more user devices 103 and PoP 101 of ECP 100. As shown in FIG. 2, PoP 101 may include request director 201, first compute device 105-1, and second compute device 105-2.

First compute device 105-1 may cache (at 202) copies of a first original image and a second original image. Second compute device 105-2 may be configured to perform an image optimization function, and may cache (at 204) different output resulting from earlier execution of the image optimization function with different customizable parameters. For instance, second compute device 105-2 may generate and cache (at 204) a first optimized image that reduces the resolution of the first original image from 1024×768 pixels to 480×480 pixels, a second optimized image that reduces the resolution of the first original image to 480×480 pixels and that rotates the first original by 90 degrees, and a third optimized image that reduces the resolution of the first original image to 640×480 pixels and encodes the first original image in a different format (e.g., convert from a *.tiff format to a *.jpg format).

User device 103 may issue (at 206) a first request for the first original image. In particular, the first request may include a URL or another identifier that directly links to the first original image. Request director 201 may receive (at 206) the first request, may hash the URL or identifier, and may determine that first compute device 105-1 is tasked with delivering the first original image. Accordingly, request director 201 may forward (at 208) the first request to first compute device 105-1, and first compute device 105-1 may serve (at 210) the first original image from cache to user device 103.

User device 103 may issue (at 212) a second request for the third optimized image. In particular, the second request may include a URL or another identifier for requesting the first original image with one or more transformation parameters. In some embodiments, the one or more transformation parameters may be appended to the URL, that identifies and/or links to the first original image, as a set of query string parameters. For instance, the first request for the first original image may be specified as "~/path/image_x.tiff", and the second request for a transformed variant of the first original image may be specified as "~/path/image_x.tiff?size=1024×768".

In some embodiments, a content provider may embed the first request in a first set of content that is accessible to a first set of user devices with higher resolution displays, greater bandwidth, and/or greater performance, and may embed the second request in a second set of content that is accessible to a second set of user devices with lower resolution displays, lower bandwidth, and/or lesser performance. In some embodiments, the first set of user devices and the second set of user devices may access the same content, and the first request or the second request may be dynamically generated as a result of a script that is embedded in the content. The script may query the user device in order to generate the first request or the second request based on the characteristics or properties of the user device. In some embodiments, the transformation parameters may include conditional parameters that alter the execution of the called function based on the presence or absence of other values in request URL, header, and/or body that may be unrelated to the transformation parameters and/or function definition. As will be explained in detail below, the request may include a transformation parameter that requests an original image in a "*.webp" format. This particular transformation parameter may be a conditional parameter that returns the image in the *.webp format when the header of the request also includes the "Accept: image/webp" to indicate that the requesting user device supports the *.webp format. If the request header omits the "Accept: image/webp" field, the function may generate the optimized image in its original format.

In some other embodiments, the second request may include the URL for the first original image without transformation parameters as query string parameters of the request. Instead, the header of the second request may identify properties of user device 103. For instance, the second request URL may specify an identifier for the first original image, and the second request header may identify the user-agent (e.g., device type), supported browser, supported resolutions, and/or properties of user device 103. Request director 201 may perform a lookup of the URL to determine that the first original image is subject to optimization by the optimization function running at second compute device 105-2, and may dynamically differentiate the second request as a request for an optimized image based on the header. Request director 201 may dynamically differentiate the second request by modifying the URL and/or header of the second request to include the transformation parameters by which the optimization function may generate the third optimized image.

In any case, request director 201 may determine that the second request is for an optimized variant of the first original image, may perform a lookup to determine that second compute device 105-2 is configured with the optimization function for the first original image and/or for generating the optimized variants of the first original image, and may forward (at 214) the second request to second compute device 105-2. In response to receiving (at 214) the second request, second compute device 105-2 may perform (at 216) a lookup in local cache to determine if the third optimized image is cached.

As will be discussed in detail below, performing (at 216) the lookup may include modifying the second request to include a canonicalized and/or ordered set of transformation parameters for the implicated optimization function. The canonicalized and/or ordered set of transformation parameters may include the transformation parameters that are included with second request, and/or that are added to the second request in order to present default values for transformation parameters that were not specified as part of the second request but that are used by the implicated optimization function. Moreover, the canonicalized and/or ordered set of transformation parameters may present the values for the transformation parameters of the implicated optimization function and/or identifiers for the transformation parameters in a uniform structure and/or format that may differ from the structure and/or format of the transformation parameters in the second request.

Performing (at 216) the lookup may further include hashing the URL with the canonicalized and/or ordered set of transformation parameters, and selecting the third optimized image from local cache of second compute device 105-2 based on the hash result. Second compute device 105-2 may serve (at 218) the third optimized image from cache to user device 103 without having to invoke or execute the optimization function that is configured for the first original image, and/or without consuming compute resources to generate the third optimized image.

User device 103 may issue (at 220) a third request for an optimized variant of the second original image that has not yet been generated by second compute device 105-2. Request director 201 may receive (at 220) the third request, may inspect the URL and/or header of the third request, may determine that the third request is for an optimized variant of the second original image, and may forward (at 222) the third request to second compute device 105-2 based on second compute device 105-2 being configured to execute the optimization function for the second original image, and/or to cache optimized variants of the second original image that are generated using the optimization function.

Second compute device 105-2 may modify the third request to include a canonicalized and/or ordered set of all transformation parameters for the implicated optimization function, whether the transformation parameters are defined as part of the third request or are dynamically added to the third request to satisfy the canonicalized structure or format. Second compute device 105-2 may perform (at 224) a lookup in the local cache using the modified third request with the canonicalized form, and may determine (at 226) that the requested variant of the second original image is not cached and/or has not been previously generated.

Second compute device 105-2 may dynamically generate the variant of the second original image requested with the third request using the optimization function. To do so, second compute device 105-2 may determine that a copy of the second original image from which to generate the requested variant is not in local cache, and may issue (at 228) a request for the second original image. In some embodiments, second compute device 105-2 may generate the request for the second original image by stripping the set of transformation parameters from the URL of the third request. In some embodiments, second compute device 105-2 may directly issue (at 228) the second original image request to first compute device 105-1 by hashing the stripped URL, and by identifying first compute device 105-1 as a source within PoP 101 for distributing the second original image. In some other embodiments, second compute device 105-2 may provide the second original image request to request director 201. Request director 201 may hash the URL of the second original image request, may determine that first compute device 105-1 is tasked with caching and distributing the second original image, and may distribute the second original image request from second compute device 105-2 to first compute device 105-1. First compute device 105-1 may then provide (at 230) the second original image to second compute device 105-2.

In response to obtaining the second original image, second compute device 105-2 may generate (at 232) fourth optimized image using the optimization function. In particular, second compute device 105-2 may use the optimization function to modify the second original image according to the set of transformation parameters that are specified with the third request and/or that were included as part of a canonicalized form of the set of transformation parameters created from the third request.

Second compute device 105-2 may provide (at 234) the fourth optimized image to user device 103, and/or may store (at 236) the fourth optimized image to the local cache. Accordingly, a subsequent request from the same or different user device 103 that specifies the same set of transformation parameters as the third request and/or that has the same values for the canonicalized form of the third request may be immediately served from second compute device 105-2 using the fourth optimized image that is stored in the local cache without having to generate the optimized image anew via another execution of the optimization function.

As shown in FIG. 2, any customer or user device 103 may access and/or use the optimization function at second compute device 105-2 to dynamically generate different variants of the first original image, the second original image, and/or any other image distributed from PoP 101. In other words, the optimization function may be used to optimize and/or modify original images of other customers, user devices 103, and/or content providers. For instance, the first original image may be provided by a first content provider, the second original image may be provided a different second content provider, a call for an optimized variant of the first original image may pass to second compute device 105-2, and second compute device 105-2 may use the same optimization to generate the optimized variants of the first original image. Accordingly, a single instance of the image optimization function may be deployed to second compute device 105-2 for the image optimizations that are performed in response to image requests coming to PoP 101 for content of different customers. This eliminates the need for each particular customer to develop, deploy, and run their own instance of the image optimization function that optimizes only the images of that particular customer (and not images of other customers). The single shared instance of the image optimization function therefore reduces resource consumption across PoP 101 (e.g., consuming compute resources of other compute devices in PoP 101 to run different instances of the same function), and avoids having idle functions deployed across PoP 101 when the functions perform the same operations but are used to modify the content of specific customers or content providers.

In the event that demand for the image optimization function at second compute device 105-2 increases beyond capacity and/or resources of second compute device 105-2, controller 107 may allocate another compute device (e.g., first compute device 105-1) from the same PoP 101 to execute the image optimization function, and request director 201 may distribute requests for optimized variants of images between the two or more compute devices 105 configured with the image optimization function.

Moreover, by caching the generated variants of the first original image and the second original image at second compute device 105-2 and by using a canonicalized and/or ordered formatting of the transformation parameters to identify each image variant, second compute device 105-2 may preserve the compute resources and/or image optimization function for image variants that are yet to be generated. In this manner, second compute device 105-2 may support a larger number of requests than if each request resulted in having to execute the image optimization function anew and/or to generate an optimized image anew for each request.

Figure 3:
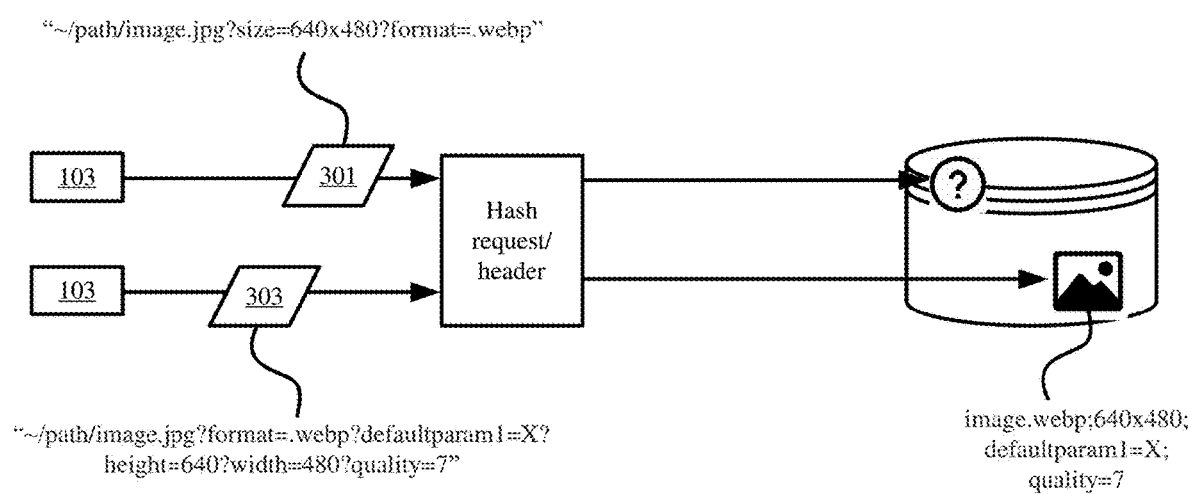
FIG. 3 illustrates an example of different requests with different transformation parameter formats for requesting the same variant of an original file in accordance with some embodiments presented herein.

The canonicalized and/or ordered mapping of the transformation parameters to a uniform format and/or structure may allow compute devices 105 of ECP 100 to detect different formatted requests as being directed to the same optimized variant of a file and/or calls for executing the same function with the same transformation parameters. FIG. 3 illustrates an example of different requests 301 and 303 with different transformation parameter formats for requesting the same variant of an original file in accordance with some embodiments presented herein.

Requests 301 and 303 may be issued from same or different user devices 103. Requests 301 and 303 may include the same base URL and/or identifier for identifying the same original file (e.g., "~/path/image.jpg"). Requests 301 and 303 may also include some of the same transformation parameters specified using different formats (e.g., "size=640×480" and "height=640?width=480"), some of the same transformation parameters specified in a different order (e.g., "format=.webp" as the last transformation parameter of request 301 and as the first transformation parameter of request 303), and/or different transformation parameters that may be part of request 303 but that are not part of request 301 and vice versa.

On initial inspection, requests 301 and 303, due to their different transformation parameter formatting, ordering, and/or definitions may seem to be directed to different variants of the same original file. However, the different formatting may not affect the optimization function execution and/or output when the transformation parameters define the same input parameter of the optimization function and specify the same value for the input parameter. Similarly, the different ordering may not affect the optimization function execution and/or output when the transformation parameters specify the same values. Accordingly, in some embodiments, compute devices 105 may reorder and reformat the transformation parameters that are used for a particular optimization function to a particular uniform canonicalized and/or ordered format.

In some embodiments, the different transformation parameter definitions may not affect the optimization function execution and/or output when the explicit definition of one transformation parameter in request 303 provides a default value that may be implicitly referenced in request 301 without explicit definition of that transformation parameter. In other words, some of the different transformation parameters included with request 303, but not with request 301, may include transformation parameters that are optional and/or that are explicitly set in request 303 with default values. Accordingly, in some embodiments, compute devices 105 may add optional transformation parameters with default values to a request that does not explicitly define those transformation parameters. The added parameters with the default values may be included as part of the reordering and reformatting that is performed to produce the uniform canonicalized and/or ordered form of requests 301 and 303. Similarly, parameters that are included with a request and that are not used by the implicated function (e.g., other query string parameters or parameters for other functions, uses, etc.) may be removed from the canonicalized and/or ordered form of that request.

In summary, generating the canonicalized and/or ordered transformation parameters for calling a particular function may include adding function parameters with default values that are not explicitly defined in the original request, removing parameters that are defined in the original request but that are not used by the particular function, and reordering and reformatting the remaining transformation parameters and their corresponding values to a uniform structure and/or format that is defined for calling the particular function. Generating the canonicalized and/or ordered transformation parameters may include modifying a received request and processing the modified request in place of the received request, wherein the modified request may include modifying the URL, header, and/or cache key of the received request to specify the transformation parameters for the particular function according to canonicalized and/or ordered uniform structure.

Figure 4:
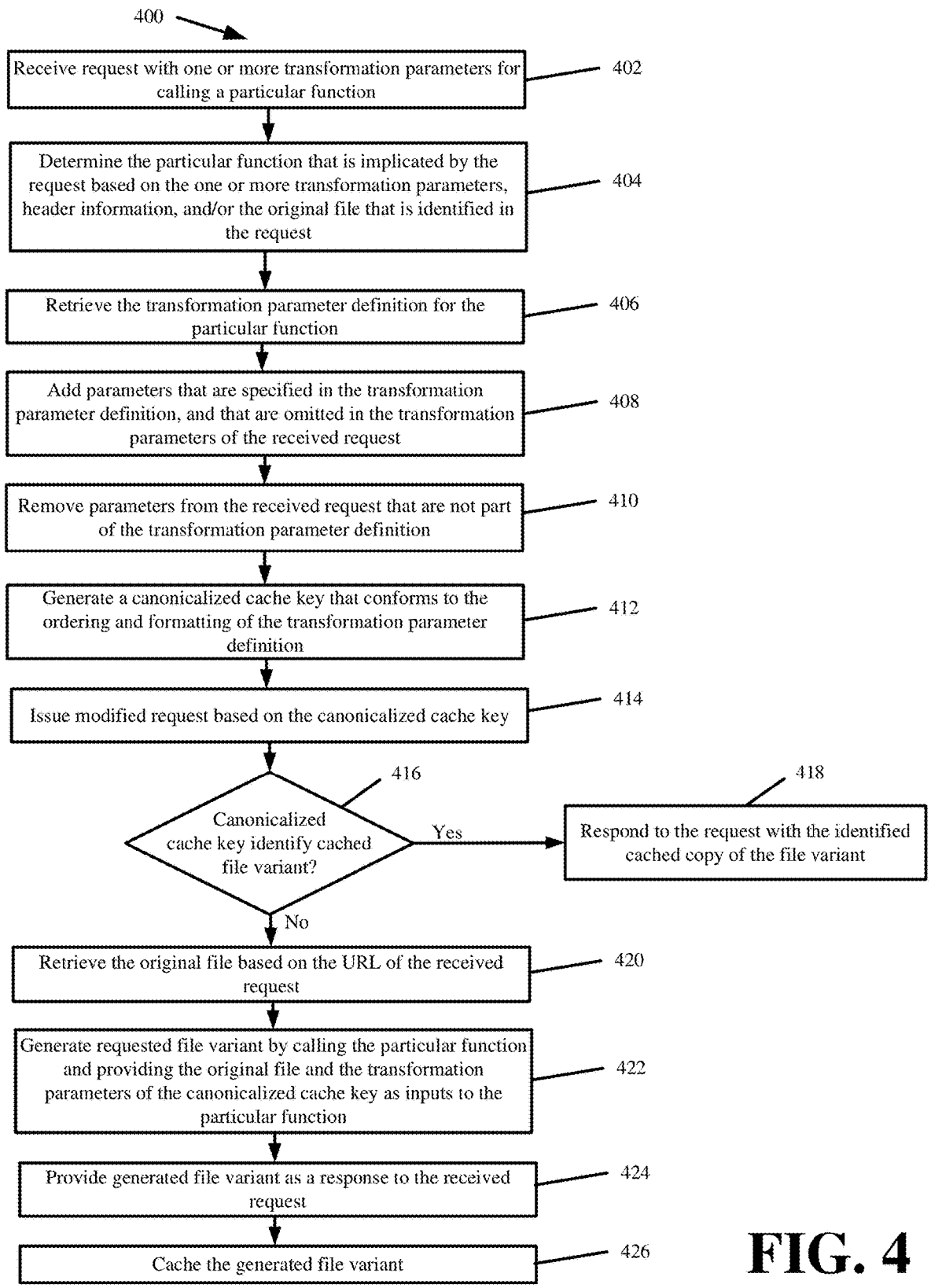
FIG. 4 presents a process for modifying an original request to a canonicalized and/or ordered form, and using the modified request with the canonicalized and/or ordered form to generate, retrieve, and/or otherwise access a particular variant of an original file in accordance with some embodiments presented herein.

FIG. 4 presents a process 400 for modifying an original request to a canonicalized and/or ordered form, and using the modified request with the canonicalized and/or ordered form to generate, retrieve, and/or otherwise access a particular variant of an original file in accordance with some embodiments presented herein. Process 400 may be implemented by any compute device 105 that uses a function implicated by the modified request to generate and/or cache different variants of one or more files, and that responds to requests for the different file variants using the output of the implicated function and/or cached instances of prior output.

Process 400 may include receiving (at 402) a request with one or more transformation parameters that are used to configure output of a particular function and/or to specify properties of the requested file variant. In some embodiments, a particular compute device may receive (at 402) the request from a user device, a request director, and/or another device that may operate in the same PoP as the particular compute device. In some embodiments, the request may include a HyperText Transfer Protocol ("HTTP") GET request or a request of a different protocol, and may include a URL that identifies the original file with the one or more transformation parameters included in the URL, as query string parameters, and/or as header fields.

Process 400 may include determining (at 404) the particular function that is implicated by the request based on the one or more transformation parameters, header information, and/or the original file that is identified in the request. In some embodiments, the one or more transformation parameters may include labels, tags, keys, and/or other identifiers that are unique to the particular function and/or that uniquely map to the particular. For instance, the request may include "size=XXXXxYYYY" that directly maps to a particular transformation parameter of the particular function, or may include "height=XXXX" and "width=YYYY" that specify a size property of the requested file variant and that collectively map to the particular transformation parameter. In some embodiments, the header information may provide identifying information about the requesting device (e.g., user agent), requesting user (e.g., source address), and/or requested original file, and the particular compute device may determine (at 404) that the particular function is applicable to the request based on the one or more transformation parameters and/or the header identifying information. In some embodiments, the request URL may include an extension of the original file from which the file type may be identified. The particular compute device may determine (at 404) the particular function that is applicable to the request based on the file type and/or the one or more transformation parameters. For instance, the particular compute device may be configured with a first function for modifying image file types (e.g., *.jpg, *.tiff, *.gif, *.webp, and/or other image file extensions), and a second function for modifying video file types (e.g., *.mpg, *.mov, *.ts, and/or other video file extensions). Similarly, the particular compute device may be configured to provide access to the particular function for a request that includes a first customer identifier and a particular file type (e.g., "~/customerXYZ/path/image.jpg"), and may restrict or prevent access to the particular function and/or any other functions of the common set of functions for a request that includes a different second customer identifier and the particular file type (e.g., "~/customer123/path/imagejpg"). Accordingly, in some embodiments, the request may indirectly call the particular function based on the transformation parameters and/or information provided with the request. In some other embodiments, the request may directly call the particular function by including the call in the request URL and/or header. In any case, the particular compute device may store a mapping between different functions configured for execution at the particular compute device and transformation parameter identifiers (e.g., names, keys, etc.), original file name, original file type, and/or user device properties found in the request.

Process 400 may include retrieving (at 406) the transformation parameter definition for the particular function. The transformation parameter definition may include a particular ordering and formatting for transformation parameters used to call the particular function. The transformation parameter definition may identify some of the transformation parameters specified with the request in a different order and/or in a different format. For instance, the transformation parameter definition may specify "resolution=XXXXxYYYY" as the correct format for a sizing parameter of the particular function, whereas the one or more transformation parameters of the request may specify the sizing parameter as "height=XXXX&width=YYYY".

Process 400 may include adding (at 408) zero or more parameters that are specified in the transformation parameter definition, and that are omitted in the one or more transformation parameters of the received request. Adding (at 408) the zero or more parameters may include adding transformation parameters with default values for those transformation parameters that control, configure, and/or otherwise affect operation of the particular function and that are not explicitly defined in URL, header, or other parts of the received request. The added parameters may include optional parameters and/or parameters of the original file that are not changed in the requested variant of the original file. For example, the requested variant may have a different encoding or file format than the original file, but the same resolution as the original file. Accordingly, the one or more transformation parameters provided with the request may include parameters for specifying the encoding or file format change, but no transformation parameters for changing the resolution. In this example, adding (at 408) the zero or more parameters may include appending a size/resolution parameter to the one or more transformation parameters that are included in the original request URL, request header, and/or a cache key that is generated based on the one or more transformation parameters from the received request.

Process 400 may include removing (at 410) zero or more parameters from the received request that are not part of the transformation parameter definition. Accordingly, the particular compute device may filter out parameters (e.g., query string parameters, header fields, etc.) that are not applicable to the particular function (e.g., parameters that are not inputs for the particular function). The parameters may be removed from the request URL, header, and/or cache key that is generated from the transformation parameters of the request that are applicable to the particular function and/or other added parameters that are applicable to the particular function but that were not specified in the received request.

Process 400 may include generating (at 412) a canonicalized cache key that conforms to the ordering and formatting of the transformation parameter definition. Generating (at 412) the canonicalized cache key may include providing an ordering and/or formatting that matches the ordering and/or formatting specified in the transformation parameter definition for the one or more transformation parameters retained from the received request and/or the parameters there were added (at 408) to the retained transformation parameters. For instance, the particular compute device may modify positions of a "resolution" parameter and a "quality" parameter in a URL of the received request when the transformation parameter definition for the particular function includes the "resolution" before the "quality" parameter. Similarly, the request may include the parameters "height=1024&width=768", and the particular compute device may convert this particular parameter to "resolution=1024×768" in the generated (at 412) canonicalized cache key.

Process 400 may include issuing (at 414) a modified request based on the canonicalized cache key. In some embodiments, issuing (at 414) the modified request may include replacing the original received request with the modified request, and processing the modified request, instead of the original received request, at the particular compute device. In some such embodiments, the modified request may restructure and/or reformat the original request, and may include a uniformly structured representation of the original request that conforms to the structure and/or formatting defined by the transformation parameter definition of the particular function.

Process 400 may include determining (at 416) whether the canonicalized cache key identifies a file variant that was generated using the particular function for a prior request, and/or that is stored in local cache of the particular compute device. Determining (at 416) if the requested file variant exists may include performing a lookup based on the canonicalized cache key. In some embodiments, the particular compute device may perform the lookup by hashing the canonicalized cache key rather than the original request URL, and by determining if the hash result is found in a cache table, wherein the cache table may store the hashed result of the canonicalized cache key for each variant of the original file that is cached by the particular compute device. In some embodiments, the canonicalized cache key for each generated and cached variant of the original file may be stored as metadata or in the header of that file variant, and may be directly queried and/or indexed by the particular compute device.

In response to determining (at 416—Yes) that the requested file variant has already been generated and/or is stored in local memory, storage, and/or cache of the particular compute device, process 400 may include responding (at 418) to the request by obtaining the requested file variant from the local cache, and by distributing the requested file variant to the requesting user device. It should be noted that in this case, the requested file variant is provided to the requesting user device without using compute resources of the particular compute device to call, invoke, and/or execute the particular function.

In response to determining (at 416—No) that the request file variant has not been generated and/or is not stored in local cache, process 400 may include retrieving (at 420) a copy of the original file based on the URL of the received request, wherein the URL of the received request may identify a path or location of the original file, and may include the one or more transformation parameters added to the URL and/or header of the request. In some embodiments, the particular compute device may retrieve (at 420) the original file from local cache, another compute device in the same PoP, or a device or storage that is outside the PoP. Retrieving (at 420) the original file may include issuing a request for the original file from the particular compute device to another device.

Process 400 may include generating (at 422) the requested variant of the original file by calling the particular function and/or providing the original file and the canonicalized cache key or transformation parameters of the canonicalized cache key as input to the particular function. The transformation parameters of the canonicalized cache key may configure the particular function, and/or may control the operations that the particular function applies to the original file in order to produce the requested variant as output.

Process 400 may include providing (at 424) the generated file variant, that is obtained from the output of the particular function, as a response to the received request. Additionally, process 400 may include storing (at 426) the generated file variant to local cache and/or storage of the particular compute device or another device so that subsequent requests that are directed to the original file and that specify the same canonicalized cache key may be served using the generated file variant. Accordingly, in some embodiments, storing (at 426) the generated file variant may include caching the generated file variant with the canonicalized cache key or a hashed result of the canonicalized cache key.

In some embodiments, the generation of the canonicalized cache key, invocation of the implicated function with the canonicalized cache key, and/or generation of the file variant may be implemented as a LUA module, script, and/or other component of a compute device. The implicated function may be executed on the compute device as a non-blocking job such that the compute device may receive and respond to other requests, and/or may execute multiple functions in parallel.

Figure 5:
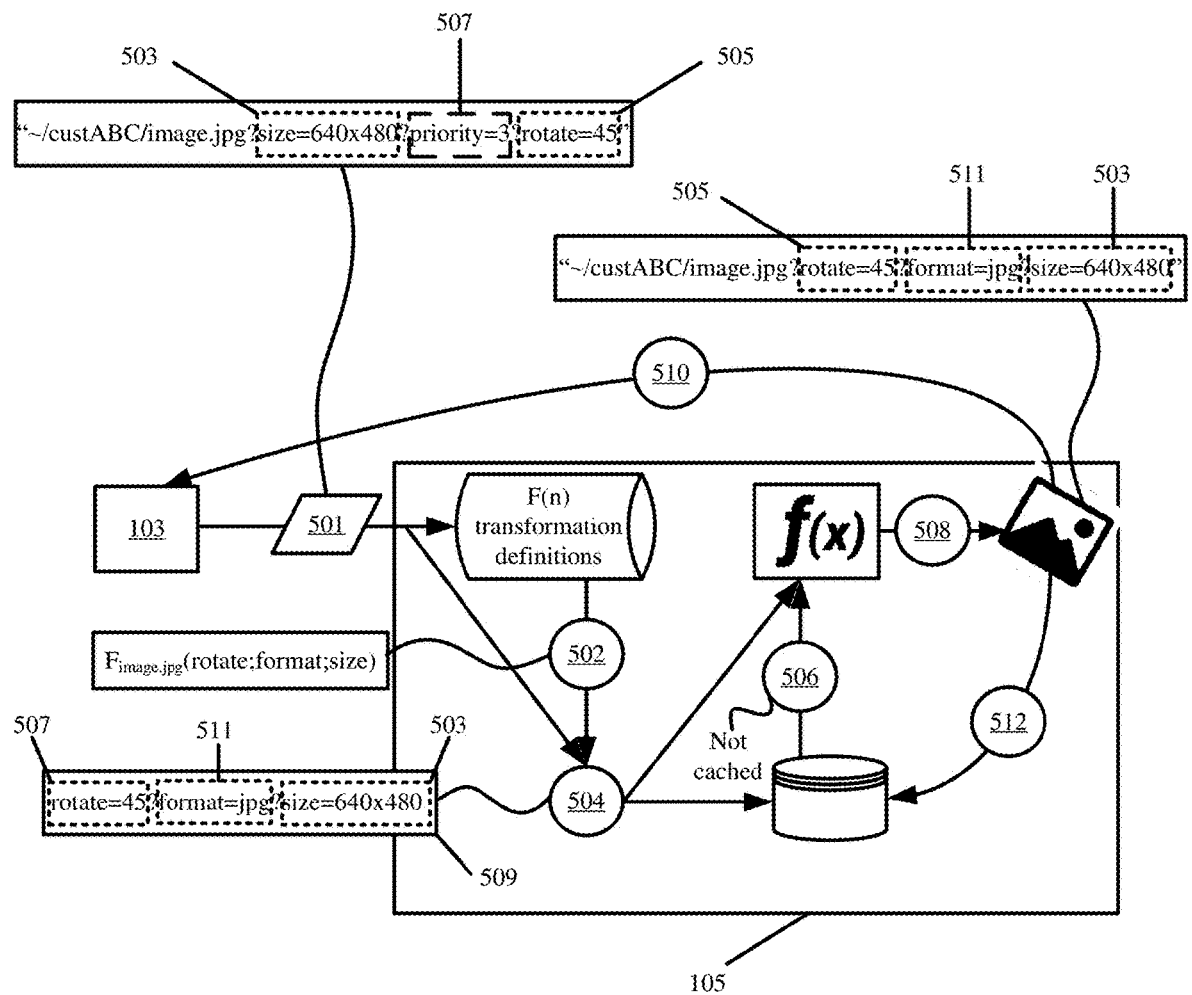
FIG. 5 illustrates an example of a modified request with a canonicalized cache key being generated for an original request in accordance with some embodiments presented herein.

FIG. 5 illustrates an example of a modified request with a canonicalized cache key being generated for an original request in accordance with some embodiments presented herein. As shown in FIG. 5, original request 501 may include a URL with three query string parameters that specify two different transformation parameters 503 and 505 for a particular function, and one parameter 507 that is not defined for the particular function.

Compute device 105 may receive original request 501, and may retrieve (at 502) the transformation parameter definition of the particular function implicated by original request 501. Compute device 105 may generate (at 504) canonicalized cache key 509 by removing query string parameter 507 that does not specify a transformation parameter for the particular function, by adding transformation parameter 511, that is specified as part of the transformation parameter definition and that is not included in original request 501, with a default value, and may reorder each of the transformation parameters to match an ordering and/or formatting of the transformation parameter definition. In some embodiments, generating (at 504) canonicalized cache key 509 may include generating a modified request with canonicalized cache key 509 in place or in addition to the URL of original request 501.

Compute device 105 may process canonicalized cache key 509 and/or the modified request with canonicalized cache key 509. Processing canonicalized cache key 509 may include determining (at 506) if the file variant requested with properties defined by transformation parameters 503 and 505 exists in cache, and calling the particular function with canonicalized cache key 509 and the original file as inputs in order to generate (at 508) the file variant with the properties defined by transformation parameters 503 and 505. Compute device 105 may provide (at 510) the generated file variant to requesting user device 103, and may cache (at 512) the generated file variant in a local storage.

Figure 6:
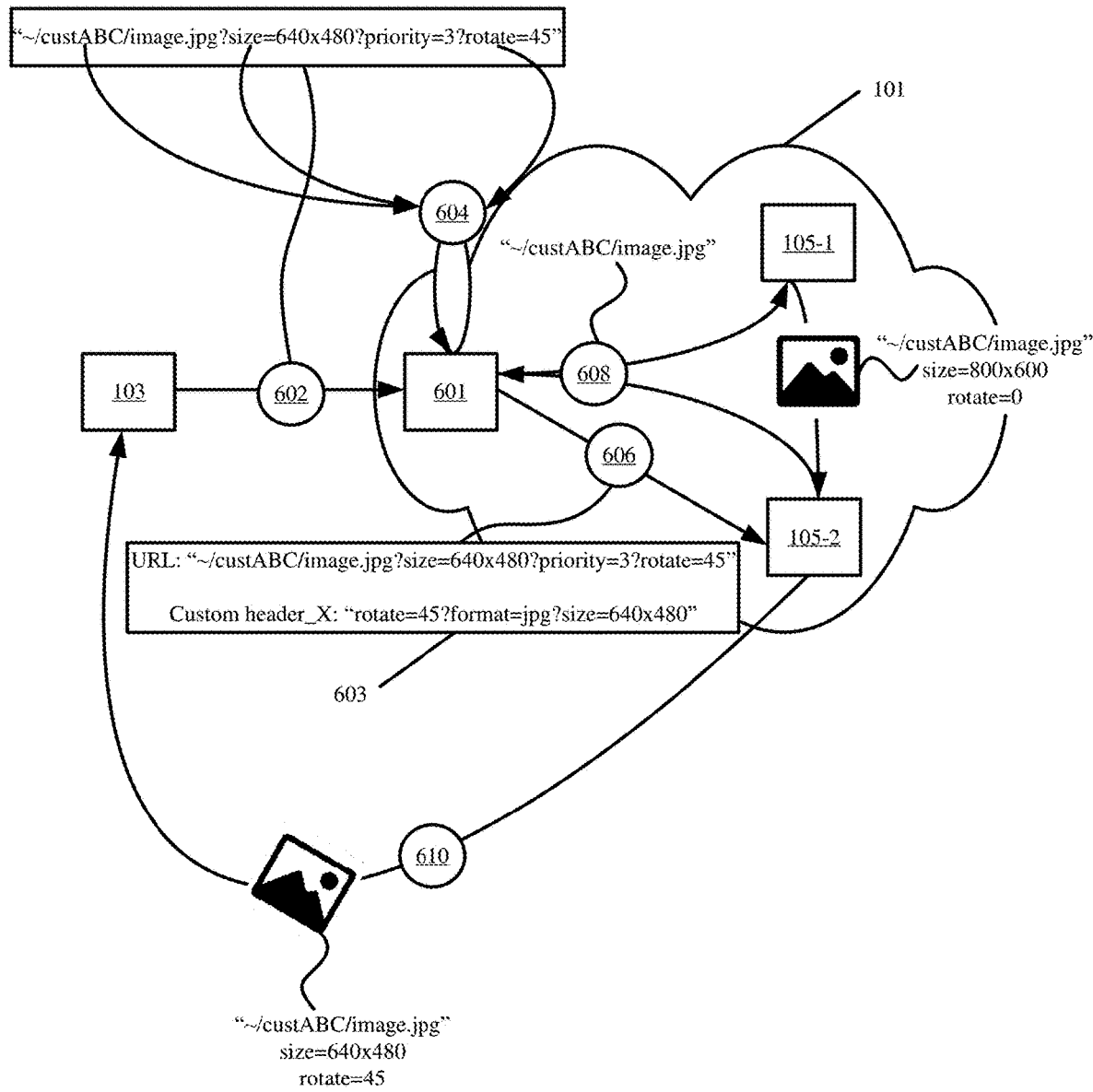
FIG. 6 illustrates an example for routing requests based on a canonicalized cache key instead of an original request URL in accordance with some embodiments presented herein.

In some embodiments, the modified request with the canonicalized cache key may be generated by a request director or other device that initially receives incoming requests to a PoP, and the modified request may be forwarded, instead of the original request, to the compute device in the PoP that is configured with the generating the different file variants with an implicated function and/or caching the file variant identified by the modified request. FIG. 6 illustrates an example for routing requests in a PoP based on a canonicalized cache key instead of an original request URL in accordance with some embodiments presented herein.

As shown in FIG. 6, request director 601 may receive (at 602) an original request from user device 103. Request director 601 may inspect the request URL and/or header to determine (at 604) that the request is for a file variant that invokes a particular function from the common set of functions that are available at PoP 101. For instance, request director 601 may detect that the original request URL includes an identifier for a particular content provider that has activated the dynamic content optimization operation of ECP 100, and may further detect that the original request includes transformation parameters and/or other identifiers that link to a particular function.

Request director 601 may obtain the transformation parameter definition for the particular function, may generate a canonicalized cache key based on the transformation parameter definition and the transformation parameters in the original request, and may forward (at 606) modified request 603 with the canonicalized cache key to second compute device 105-2. In some embodiments, request director 601 may select second compute device 105-2 as a recipient for the modified request based on a mapping that identifies the particular function being executed by second compute device 105-2. In some other embodiments, request director 601 may hash the canonicalized cache key, and may use the hash result to select second compute device 105-2 as the recipient for the modified request. As shown in FIG. 6, modified request 603 may include the exact URL from the original request, and may include the canonicalized cache key as a custom header field of the modified request.

Second compute device 105-2 may determine that the request is for a particular variant of a file that is generated using the particular function based the canonicalized cache key in modified request 603. Accordingly, second compute device 105-2 may use the canonicalized cache key to determine if the particular file variant has been previously generated and/or is stored in cache. Second compute device 105-2 may serve the particular file variant from cache without invoking the particular function if the particular file variant is cached. In this example, second compute device 105-2 does not store the particular file variant in cache. Accordingly, second compute device 105-2 may issue (at 608) a request for the original unmodified variant of the requested file within PoP 101 or to an external source. Second compute device 105-2 may generate the request for the original file by stripping the transformation parameters off the URL in the modified request, and by issuing (at 608) the original file request to request director 601 for subsequent routing to first compute device 105-1 when first compute device 105-1 is determined to cache the original file. First compute device 105-1 may provide the original file to second compute device 105-2. Second compute device 105-2 may call the particular function by providing the original file and the canonicalized cache key as inputs to the particular function, and may provide (at 610) the resulting output of the particular function to user device 103.

In some embodiments, request director 601 and/or compute devices 105 may dynamically generate the canonicalized cache key for a received request based on the transformation parameter definition of the implicated function and other data within the received request. In some such embodiments, one or more of the transformation parameters may be conditional parameters that modify operation of the implicated function based on the presence or absence of other values in the request URL, header, and/or body not defined as part of the transformation parameters.

Figure 7:
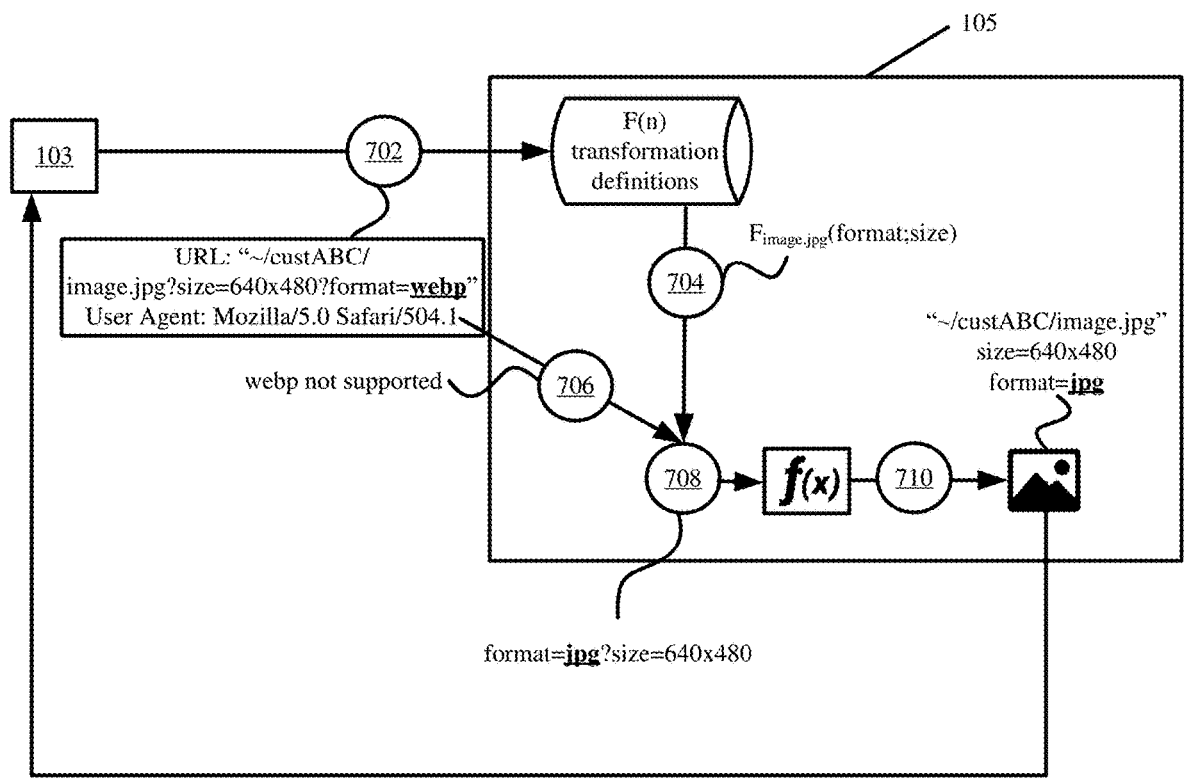
FIG. 7 illustrates an example of the dynamic canonicalized cache key generation in accordance with some embodiments presented herein

FIG. 7 illustrates an example of the dynamic canonicalized cache key generation in accordance with some embodiments presented herein. As shown in FIG. 7, compute device 105 may receive (at 702) an original request that includes a particular transformation parameter for converting an image from a first format or encoding to a second format or encoding (e.g., convert from a *.jpg file to a *.webp file) to preserve bandwidth and/or accelerate the delivery of the image when supported by the requesting user device 103. However, some user devices 103 may not support the second format, and the device support cannot be determined when defining the URL for requesting the image. Accordingly, compute device 105 may dynamically generate the canonicalized cache key with different values for the particular transformation parameter depending on whether the requesting device supports the second format.

Dynamically generating the canonicalized cache key may include retrieving (at 704) the transformation parameter definition for the implicated function, adding and/or removing transformation parameters to the original request based on the transformation parameter definition, and reordering the remaining parameters according to the ordering set in the transformation parameter definition. Additionally, compute device 105 may scan (at 706) the header of the original request to determine if requesting user device 103 supports the second format for the requested image. For instance, compute device 105 may inspect the user agent and/or supported browser version found within the request header to determine that requesting user device 103 does not support the second format and/or cannot render or present the image in the second format. In particular, the absence of "Accept: image/webp" anywhere in the received request may indicate that requesting user device 103 does not support the image format, whereas the inclusion of "Accept: image/webp" in the received request may indicate that requesting user device 103 supports the image format.

Accordingly, compute device 105 may dynamically modify (at 708) the value for the particular transformation parameter in the canonicalized cache key to ensure that the generated variant of the image is supported by requesting user device 103. In particular, compute device 105 may dynamically rewrite the request URL to change the value for the particular transformation parameter or to remove the particular transformation parameter in order to retain the original first format of the image and not convert to the second format when generating (at 710) the image variant using the implicated function.

Figure 8:
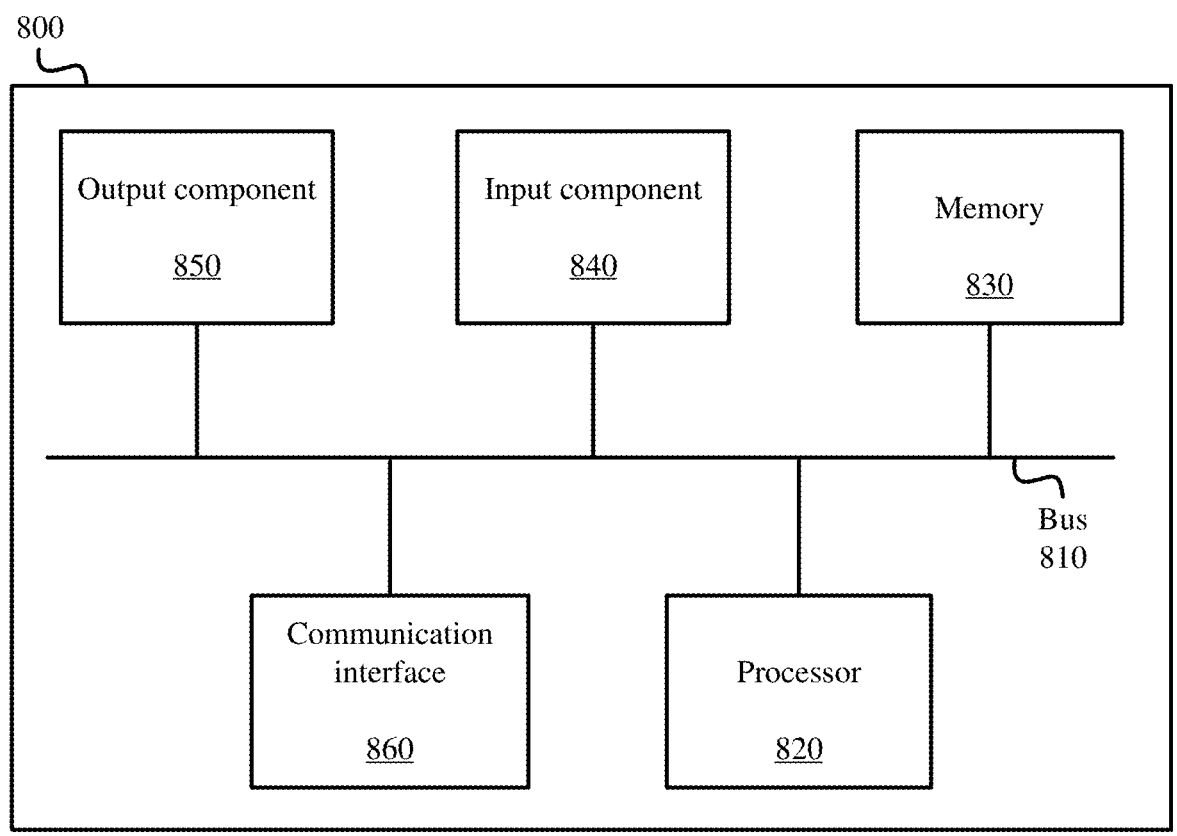
FIG. 8 illustrates example components of one or more devices, according to one or more embodiments described herein.

FIG. 8 is a diagram of example components of device 800. Device 800 may be used to implement one or more of the devices or systems described above (e.g., compute devices 105, request directors 201 and 601, user devices 103, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a request from a user device at a compute device of a content distribution platform, the request comprising a first set of transformation parameters in a first ordering and an identifier that is used to request a file from the content distribution platform;
   determining that the request invokes a particular function from a plurality of functions that are configured on the compute device and that the compute device executes to customize files prior to distribution;
   canonicalizing, by operation of the compute device, the first set of transformation parameters according to a transformation parameter definition of the particular function, wherein canonicalizing the first set of transformation parameters comprises generating a second set of transformation parameters with one or more of the first set of transformation parameters in a different second ordering;

executing, by operation of the compute device, the particular function against the file in response to determining that a first modified variant of the file identified by the identifier and the second set of transformation parameters in the second ordering is not cached at the compute device, wherein executing the particular function comprises:

retrieving a copy of the file from the content distribution platform using the identifier from the request; and generating the first modified variant of the file that is different than the file based on the second set of transformation parameters adjusting changes that the particular function applies to the copy of the file; and distributing the first modified variant of the file from the compute device to the user device in response to the request.

2. The method of claim 1 further comprising:
scanning a local cache of the compute device for a cached copy of the first modified variant of the file using the identifier and the second set of transformation parameters in the second ordering.

3. The method of claim 2 further comprising:
distributing the first modified variant of the file from the local cache without calling the particular function in response to said scanning identifying the cached copy of the first modified variant of the file; and
wherein executing the particular function comprises calling the particular function with the second set of transformation parameters in the second ordering and the copy of the file as input in response to said scanning identifying that no cached copy of the first modified variant of the file exists in the local cache.

4. The method of claim 1,
wherein canonicalizing the first set of transformation parameters further comprises determining the second ordering for the second set of transformation parameters based on the transformation parameter definition setting a particular order by which each transformation parameter of the first set of transformation parameters is input to the particular function,
wherein the particular order is different than the first ordering, and
wherein the particular order matches the second ordering.

5. The method of claim 1, wherein canonicalizing the first set of transformation parameters further comprises:
adding a new transformation parameter with a default value in between two transformation parameters of the first set of transformation parameters, wherein the new transformation parameter is not in the first set of transformation parameters and is defined in the transformation parameter definition.

6. The method of claim 5, wherein canonicalizing the first set of transformation parameters further comprises:
removing at least one parameter in the first set of transformation parameters from the second set of transformation parameters, wherein the at least one parameter comprises a query string parameter of the request that is not defined in the transformation parameter definition of the particular function.

7. The method of claim 1 further comprising:
issuing a modified request in place of the request received from the user device, wherein the modified request comprises the second set of transformation parameters as a cache key.

8. The method of claim 1 further comprising:
receiving a second request with a third set of transformation parameters in a third ordering that is different than the first ordering;
canonicalizing the third set of transformation parameters according to the transformation parameter definition; and
providing the first modified variant of the file in response to the second request without a second invocation of the particular function in response to a canonicalized representation of the third set of transformation parameters comprising the second set of transformation parameters in the second ordering and values that match values of the second set of transformation parameters.

9. The method of claim 8,
wherein the third set of transformation parameters comprises at least one different parameter not in first set of transformation parameters, and
wherein the at least one different parameter is defined in the third set of transformation parameters with a default value provided for the at least one different parameter in the transformation parameter definition.

10. The method of claim 1, wherein generating the first modified variant of the file comprises:
changing one or more of a resolution, encoding, format, size, quality, and rotation of the file based on the changes that the particular function applies to the copy of the file when configured with the second set of transformation parameters.

11. The method of claim 1 further comprising:
deploying the particular function as a first function to the compute device, wherein the compute device is a first compute device of a plurality of compute devices in a point-of-presence ("PoP") of the content distribution platform;
deploying a different second function to a second compute device of the plurality of compute devices in the PoP; and
distributing the request to the first compute device in response to the request comprising one or more identifiers that implicate the first function.

12. The method of claim 1 further comprising:
distributing the request to a first compute device of a plurality of compute devices in a PoP of the content distribution platform based on one or more of a Uniform Resource Locator ("URL") or header of the request implicating the particular function and the compute device corresponding to the first compute device; and
wherein retrieving the copy of the file comprises retrieving the copy of the file from a second compute device of the plurality of compute devices based on a modified URL of the request that excludes the first set of transformation parameters.

13. The method of claim 1 further comprising:
receiving a second request comprising the identifier of the file without the first set of transformation parameters; and
providing the file in response to the second request based on the second request not implicating the particular function as a result of the second request lacking any transformation parameters that are specified in the transformation parameter definition of the particular function.

14. The method of claim 1 further comprising:
deploying the particular function to the compute device, wherein the compute device is a first compute device of a plurality of compute devices in a PoP of the content distribution platform;
storing the file at a second compute device of the plurality of compute devices in the PoP;
distributing the request as a first request to the first compute device in response to the first set of transformation parameters implicating the particular function; and
distributing a second request comprising the identifier of the file to the second compute device in response to the second request omitting any transformation parameters that are specified in the transformation parameter definition of the particular function.

15. A compute device of a content distribution platform, the compute device comprising:
one or more processors configured to:
receive a request from a user device at the compute device, the request comprising a first set of transformation parameters in a first ordering and an identifier that is used to request a file from the content distribution platform;
determine that the request invokes a particular function from a plurality of functions that are configured on the compute device and that the compute device executes to customize files prior to distribution;
canonicalize the first set of transformation parameters according to a transformation parameter definition of the particular function, wherein canonicalizing the first set of transformation parameters comprises generating a second set of transformation parameters with one or more of the first set of transformation parameters in a different second ordering;
execute the particular function against the file in response to determining that a first modified variant of the file identified by the identifier and the second set of transformation parameters in the second ordering is not cached at the compute device, wherein executing the particular function comprises:
retrieving a copy of the file from the content distribution platform using the identifier from the request; and
generating the first modified variant of the file that is different than the file based on the second set of transformation parameters adjusting changes that the particular function applies to the copy of the file; and
distribute the first modified variant of the file from the compute device to the user device in response to the request.

16. The compute device of claim 15, wherein the one or more processors are further configured to:
scan a local cache of the compute device for a cached copy of the first modified variant of the file using the identifier and the second set of transformation parameters in the second ordering.

17. The compute device of claim 16, wherein the one or more processors are further configured to:
distribute the first modified variant of the file from the local cache without calling the particular function in response to said scanning identifying the cached copy of the first modified variant of the file; and
wherein executing the particular function comprises calling the particular function with the second set of transformation parameters in the second ordering and the copy of the file as input in response to said scanning identifying that no cached copy of the first modified variant of the file exists in the local cache.

18. The compute device of claim 15, wherein the one or more processors are further configured to:
issue a modified request in place of the request received from the user device, wherein the modified request comprises the second set of transformation parameters as a cache key.

19. The compute device of claim 15, wherein the one or more processors are further configured to:
receive a second request with a third set of transformation parameters in a third ordering that is different than the first ordering;
canonicalize the third set of transformation parameters according to the transformation parameter definition; and
provide the first modified variant of the original file in response to the second request without a second invocation of the particular function in response to a canonicalized representation of the third set of transformation parameters comprising the second set of transformation parameters in the second ordering and values that match values of the second set of transformation parameters.

20. A non-transitory computer-readable medium, storing a plurality of processor-executable instructions to:
receive a request from a user device at a compute device of a content distribution platform, the request comprising a first set of transformation parameters in a first ordering and an identifier that is used to request a file from the content distribution platform;
determine that the request invokes a particular function from a plurality of functions that are configured on the compute device and that the compute device executes to customize files prior to distribution;
canonicalize the first set of transformation parameters according to a transformation parameter definition of the particular function, wherein canonicalizing the first set of transformation parameters comprises generating a second set of transformation parameters with one or more of the first set of transformation parameters in a different second ordering;
execute the particular function against the file in response to determining that a first modified variant of the file identified by the identifier and the second set of transformation parameters in the second ordering is not cached at the compute device, wherein executing the particular function comprises:
retrieving a copy of the file from the content distribution platform using the identifier from the request; and
generating the first modified variant of the file that is different than the file based on the second set of transformation parameters adjusting changes that the particular function applies to the copy of the file; and
distribute the first modified variant of the file from the compute device to the user device in response to the request.

* * * * *